United States Patent [19]
Alwitt

[11] 3,779,877
[45] Dec. 18, 1973

[54] ELECTROLYTIC ETCHING OF ALUMINUM FOIL

[75] Inventor: Robert S. Alwitt, Williamstown, Mass.

[73] Assignee: Sprague Electric Company, North Adams, Mass.

[22] Filed: Feb. 22, 1972

[21] Appl. No.: 227,951

[52] U.S. Cl. .......................... 204/129.75, 204/129.1
[51] Int. Cl. .......................... C23b 3/02, C23b 1/00
[58] Field of Search .................. 204/129.75, 129.1, 204/129.43, 140; 252/79.1

[56] References Cited
UNITED STATES PATENTS

| | | | |
|---|---|---|---|
| 2,581,490 | 1/1952 | Larsen | 204/129.75 |
| 3,401,103 | 9/1968 | Joyce et al. | 204/129.75 |
| 3,316,164 | 4/1967 | Welch, Jr. | 252/79.1 |

*Primary Examiner*—T. Tufariello
*Attorney*—Arthur G. Connolly et al.

[57] ABSTRACT

A two stage electro-etch for increasing the effective surface area of high voltage aluminum foil comprises a first electro-etch in an alkali metal halide, preferably sodium chloride, followed by a second electro-etch in a neutral solution of a nitrate salt. The results produced with this process compare most favorably with the most advantageous processes known to the art today, and foils etched therein are less expensive to produce.

4 Claims, 1 Drawing Figure

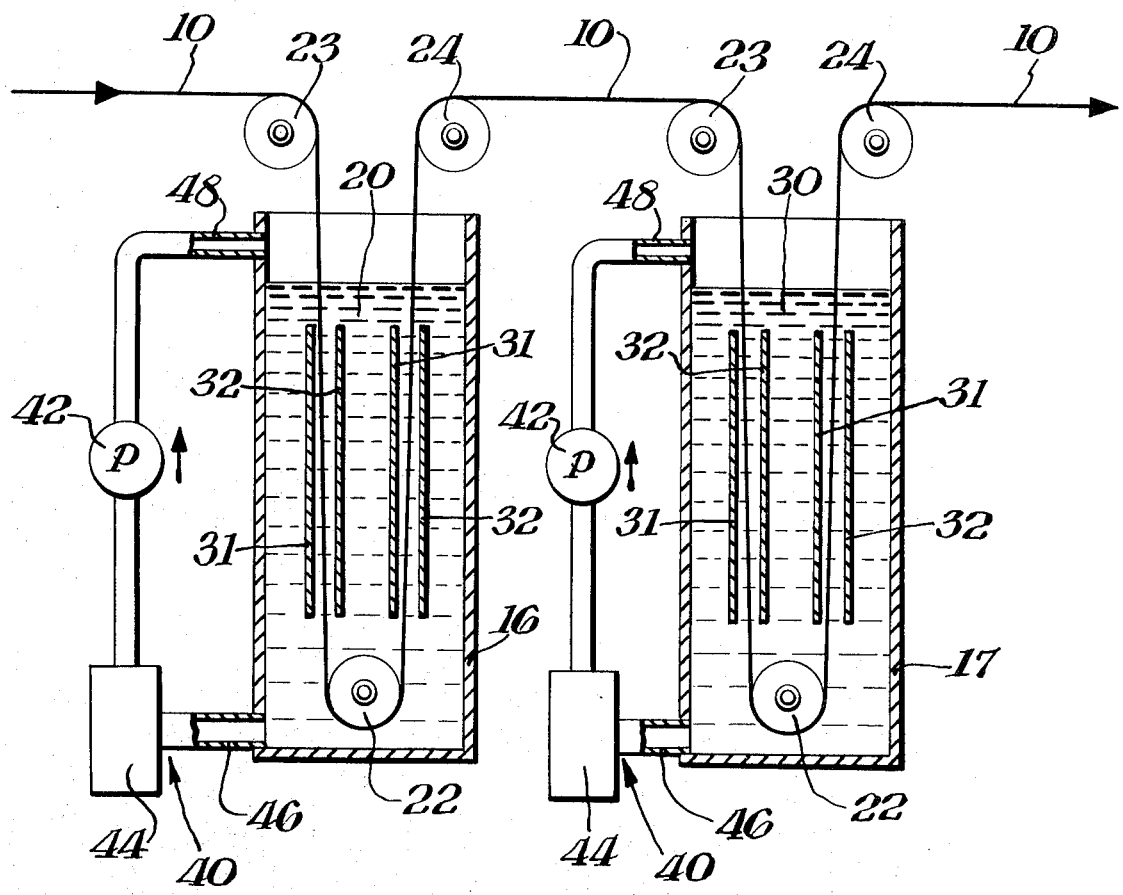

ELECTROLYTIC ETCHING OF ALUMINUM FOIL

BACKGROUND OF THE INVENTION

This invention relates to the etching of aluminum foil, and more particularly to a two stage electro-etch for high purity electrolytic capacitor grade aluminum foil.

Many aluminum electrolytic capacitors utilize electrodes of aluminum foil of 99.97 percent and higher purity. It is now conventional to prepare this high purity foil for use in electrolytic capacitors by etching procedures which increase the effective surface area of the foil, and ultimately result in an increase in the capacitance of the completed capacitor. The effective surface area of foil that has been increased by the etching operation is "formed" with a dielectric film, in accordance with established procedures, for incorporation as an anode in electrolytic capacitors to provide highly efficient devices.

The increase of capacitance resulting from etching foil is referred to as the "etch ratio" of the foil. This term refers to the ratio of the capacitance of an etched foil compared with the capacitance of an equivalent unetched foil under the same formation conditions. It is desirable to provide as large an etch ratio as can be obtained consistently for the anode foil of an electrolytic capacitor. This consistently high etch should be obtained with as small as possible loss of metal (weight loss) from the foil. The etch ratio in turn is preferably of a uniform value for given etch conditions, so that there is provided foil of uniform characteristics for capacitor electrodes. Some of the more advantageous prior art etches have utilized as part of the process a chemical etch in nitric acid. This is a very strong acid that can be dangerous to use and difficult and costly to dispose of when no longer of use as an etchant. So it is most desirable to reproduce the more advantageous results produced by the prior art processes, while avoiding the difficulties and costs that usually accompany these processes.

Inasmuch as formation of the dielectric oxide film tends to fill in and smooth out the etch structure, it is desirable that foils which are to be formed with the thick oxide required for high voltage operation be provided with an etch structure that may be characterized as pits or tunnels with a diameter greater than twice the oxide thickness.

It is an object of the present invention to provide an etching procedure for high purity electrolytic capacitor grade aluminum foil that does not use nitric acid but achieves the same favorable results attained therewith.

It is another object of the instant invention to provide a process for etching high purity aluminum foil with better control and at less cost than prior art techniques.

It is a further object of this invention to provide high purity electrolytic capacitor grade aluminum foil having reproducibly uniform characteristics after etching.

SUMMARY OF THE INVENTION

A two-stage etching process for high purity electrolytic capacitor grade aluminum foil comprising the combination of an initial attack on the foil in an electrolytic etch which is followed by a further electrolytic etch in a neutral solution of a nitrate. The initial etch operated at a particular current density establishes the etch pits and tunnels, and the second etch with the nitrate solution can be carried out at a broad range of current densities and further etches these areas without initiating new etch sites.

BRIEF DESCRIPTION OF THE DRAWING

The only FIGURE of the drawing illustrates the etching apparatus.

DESCRIPTION OF THE PREFERRED EMBODIMENTS

Broadly, this invention shows a process for etching high purity aluminum foil for use in electrolytic capacitors. The process is a two-stage electro-etch wherein the first stage is an electro-etch in an alkali metal halide (e.g., sodium chloride) in water, and the second stage is a further electro-etch in a neutral solution of a nitrate salt.

The preferred specific embodiment of this invention for etching high purity electrolytic capacitor grade aluminum foil comprises the combination of an electrolytic etch in sodium chloride solution followed by a second electrolytic etching treatment in a neutral solution of sodium nitrate.

The electrolyzing operation in accordance with this invention involves first subjecting the high purity aluminum foil to an electrolytic etching action under standard conditions now known to those skilled in the art. The etching electrolyte is an aqueous solution of an alkali metal halide selected from the class consisting of chlorides, bromides, and iodides of sodium, potassium and lithium. An etching current at any of the current densities normally employed in the art is obtained from a suitable power supply and is passed through this electrolyte solution, and hence through the foil, to bring about the etching of the metal. Secondly, these foils are etched electrolytically in a neutral nitrate solution of a group I metal, such as $NaNO_3$. The foil is made positive to inert cathodes in each etch cell to effect the electrochemical dissolution of the metal. Specimens were etched at 97°C and 1.7 amps/in$^2$ at 4.3 amp-min/in$^2$ in two concentrations of sodium nitrate with these results:

| ($NaNO_3$) g/liter | Avg. 400V cap (mfd./in$^2$) |
|---|---|
| 100 | 2.37 |
| 340 | 2.18 |

As there is very little variation in capacitance with a change in concentration of the nitrate solution, the amount of nitrate used can vary from 50 to 400 grams/liter, depending on the local power cost. A more conductive solution will, of course, lower the amount of power needed.

Since the selection of the etched areas is essentially accomplished during the first stage with the sodium chloride, varying the current density of the second or nitrate stage from 0.85 to 3.4 amps/in$^2$ has very little effect on capacitance. Some further pertinent observations are that at temperatures below 90°C for the nitrate solution there was an increased tendency for perforated foil. No perforations were observed for etch temperatures of 95°C or above. However, care should be taken not to allow the temperature to rise above the boiling point of the bath. The precipitate from this etch settled out very rapidly, leaving a completely clear solution.

The etch process can be best described by reference to the drawing. The first stage etching tank 16 contains a sodium chloride etching bath 20 through which a length of foil 10 is passed. The foil 10 enters the bath after sliding over electrical contact shoe 23 and is looped under a submerged roller 22 and then emerges from the bath to pass over electrical contact shoe 24 from which it is pulled into the nitrate etching bath 30 by sliding over electrical contact shoe 23. The foil 10 is then looped under a submerged roller 22 and emerges from the bath to pass over electrical contact shoe 24 from which it is pulled onto a take-up roll (not shown).

Within the bodies of the etching baths 20 and 30, two pairs of cathode plates 31 and 32 are placed adjacent the respective faces of the foil 10 and connected to the cathode of a source of D.C. electrical potential (each tank has its own power supply). The anode terminal of the source is connected to shoes 23 and 24 to complete the etching circuits. The cathodes should be electrically isolated from each other. Further, power supplies should be arranged so that positive terminals are common and are connected to contacting shoes 23 and 24, and the negative terminals should be isolated from each other, so that current to each tank can be controlled independently.

A recirculation loop 40 is attached to each tank and includes a pump 42 and settling chamber 44 having an intake conduit 46 opening near the bottom of tanks 16 and 17, and a discharge conduit 48 emptying into the upper portion of the tanks. By continuous or intermittent operation of the pump 42, an electrolyte is passed through the recirculation loop to permit precipitates to settle in the settling chamber 44 as the bath recirculates. The chamber 44 can be replaced when it fills with precipitate.

The entire contents of the tanks 16 and 17 are maintained at a relatively high temperature as by coils, not shown. These tanks can be made of electrically non-conductive material such as plastic; the contacting shoes can be of nickel or a nickel alloy and the cathode plates are preferably of copper.

A rinse (not shown) may be provided for between the two stages and at the end of the etching process by any conventional manner.

Another feature of this invention is that a given weight loss can be obtained with varying raw foils by simply controlling the speed of foil passage through the two-stage combination etching system and the current flow. And it should be added that the state of the art is such that neither of these variables presents a problem. Prior art techniques necessitate the control over temperature, acid concentration, trace impurities. Further, this process overcomes the vexing ecological and financial problem of disposal of waste nitric acid that is confronted by many prior art processes.

Since many modifications and variations of the present invention are possible in light of the above teachings without departing from the nature and spirit of the invention, it is to be understood that the invention is not limited to said details except as set forth in the appended claims.

What is claimed is:

1. A method for electrolytically etching aluminum foil comprising the combination of first electrolytically etching the foil in an aqueous alkali metal halide solution and subsequently electrolytically etching the foil in a neutral nitrate solution of a group I metal at a concentration of 50–400g/liter, a temperature of from 95°C to its boiling point, said foil being etched therein at 1 to 10 amp-min/in$^2$, with the current density being in the range of from 0.85 to 3.4 amp/in$^2$.

2. The method of claim 1 wherein said alkali metal halide is sodium chloride and said neutral nitrate solution is a neutral sodium nitrate solution.

3. The method of claim 1 wherein the aluminum foil has a purity of at least 99.97 percent.

4. A method for electrolytically etching electrolytic capacitor grade aluminum foil of at least 99.97 percent purity comprising the combination of first electrolytically etching the foil in aqueous sodium chloride solution, and subsequently electrolytically etching the foil in a neutral solution of 100g/liter of sodium nitrate at a temperature of 97°C and a current density of 1.7 amps/in$^2$, said foil is etched therein at 4.27 amp-min/in$^2$.

* * * * *